United States Patent [19]

Dubrunfaut

[11] 4,190,362
[45] Feb. 26, 1980

[54] LASER TELEMETER
[75] Inventor: Gérard H. Dubrunfaut, Orly, France
[73] Assignee: Societe Anonyme de Telecommunications, Paris, France
[21] Appl. No.: 901,140
[22] Filed: Apr. 28, 1978
[30] Foreign Application Priority Data
  May 4, 1977 [FR] France .............................. 77 13588
[51] Int. Cl.² .............................................. G01C 3/08
[52] U.S. Cl. ..................................... 356/5; 343/12 R
[58] Field of Search ............... 356/5, 28; 343/8, 12 R, 343/17.1 R, 17.1 PC, 17.2

[56] References Cited
U.S. PATENT DOCUMENTS
3,619,058  11/1971  Hewlett et al. ........................... 356/5
3,765,768  10/1973  Budin et al. ............................. 356/28
3,900,260  8/1975   Wendt ...................................... 356/5

FOREIGN PATENT DOCUMENTS
1585137  1/1970  France ........................................ 356/28

Primary Examiner—S. C. Buczinski
Attorney, Agent, or Firm—Jacobs & Jacobs

[57] ABSTRACT

The beam produced by a pulsed laser is directed onto a target and, once reflected, is heterodyned in a mixer with the light signal from a local oscillator. The resulting reception beat signal is applied to a chronometer to measure the distance from the target. A fraction of the transmitted beam is deviated to the mixer and heterodyned with the signal from the local oscillator to produce a transmission beat signal which is stored and then combined with the reception beat signal.

2 Claims, 4 Drawing Figures

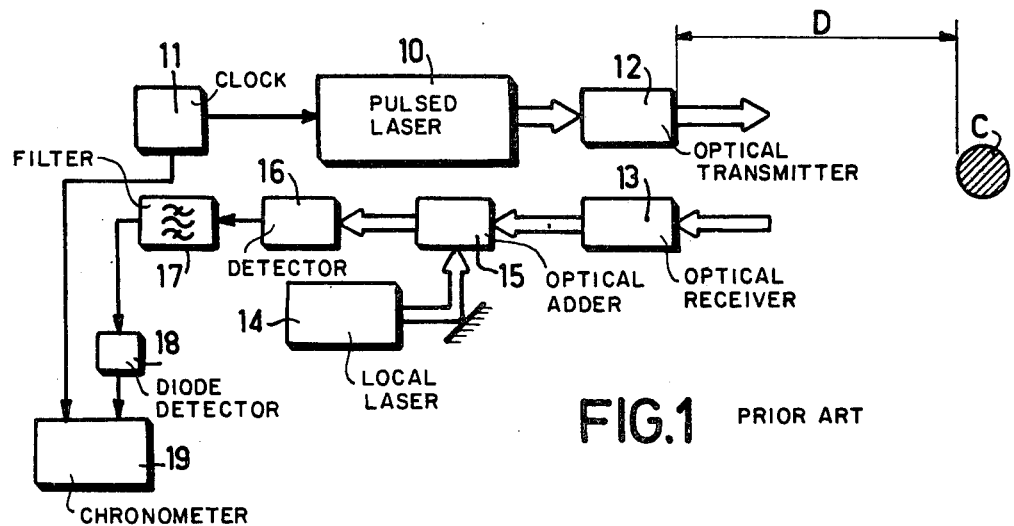
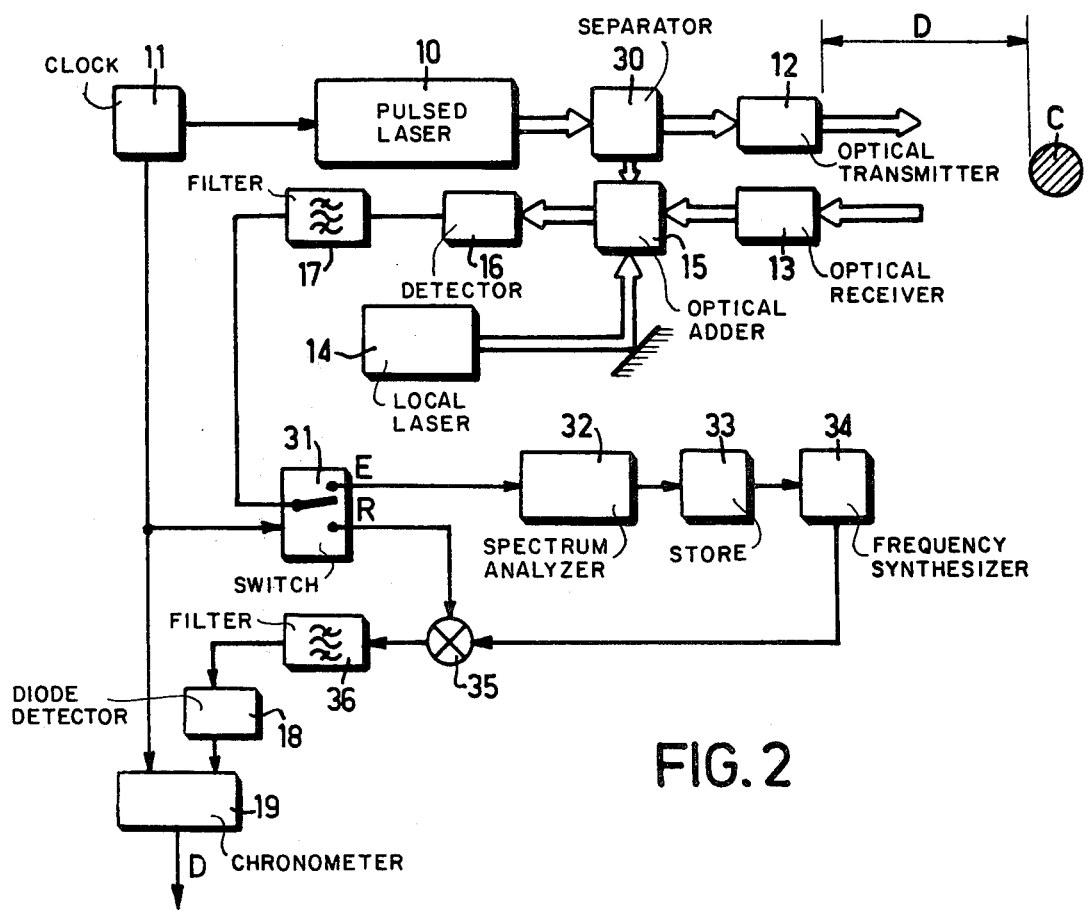
FIG. 1 PRIOR ART
FIG. 2

LASER TELEMETER

The present invention relates to laser telemeters operating according to the principle of heterodyne detection.

To determine the distance between a target and an observation station, it is known to transmit, for a very short time, a light radiation of condiderable energy in the direction of the target and to measure the time that the radiation takes to return to its point of departure after reflection on the target. To produce this radiation, a pulsed laser is used, which is capable of supplying a high pick power for a very short time.

Since the reflected signals to be detected have a very low power, it is advantageous to use a heterodyne detection technique, i.e. to add these signals with a signal of near frequency and of higher amplitude, produced by a local laser, and to apply the resulting signal to a non-linear detection member such as a photovoltaic detector, the output signal of which will be at the best frequency. It is well known that this technique provides a very high detection sensitivity.

The use of the heterodyne technique is, however, only advantageous if the frequency of the signal to be received is known with accuracy.

Now, pulsed lasers have a transmission frequency which may vary considerably from one pulse to the other. Under these conditions, the filtering of the output signal of the detector will have to be effected over a wide frequency range. If it is desired to insure a good sensitivity, the laser will have to be very powerful for the signal to be able to be discriminated from the noise. Another solution consists in improving the spectral purity of the pulsed laser, this assuming complex devices. In both cases, the equipment is bulky and expensive.

It is an object of the invention to provide an optical telemeter with heterodyne detection in which the defects associated with the poor definition of the frequency of the pulsed laser are overcome by simple means.

There is provided according to the invention an optical telemeter with heterodyne detection, comprising a pulsed laser controlled by a clock, an optical system at transmission for concentrating the energy supplied by the laser on a remote target, an optical system at reception for collecting part of the energy reflected by the target, a local oscillator for supplying a continuous light wave at a frequency near the transmission frequency of the pulsed laser, an optical adder for adding the reflected radiation from the reception optical system and the radiation supplied by the local oscillator, a photodetector receiving the radiation from the optical adder and supplying at its output an electrical signal at the beat frequency, called relfection beat signal, and a chronometer connected to the clock and to the photodetector for measuring the time lapsed between the instant of transmission and the moment when the reflected signal is received, further comprising a separator for removing part of the energy transmitted by the pulsed laser and directing it towards the optical adder, means connected to said detector for storing, before the return of the reflected radiation, the transmission beat signal thus obtained, and means for beating the transmission beat signal and the reflection beat signal, the resulting signal being applied to the chronometer.

Simple calculation shows that frequency of the resulting signal is equal to the Doppler shift $F_D$ due to the movement of the target. The problems associated with the inaccuracy of the frequency $F_o$ of the pulsed laser are solved since $F_o$ is absent from the expression of the frequency of the resulting signal. As to the inaccuracy of $F_D$, it is always, in practice, much less than that of $F_o$ and the filtering may effectively be carried out on a very narrow frequency range.

French Pat. No. 2,081,184 discloses an optical device for simultaneously measuring the distance and velocity of a moving object, comprising a pulsed laser, a local laser and optical means enabling a fraction of the beam transmitted by the pulsed laser, a fraction of the beam reflected by the target and the beam from the local laser, to be deflected towards a mixer. However, this known device does not make use of heterodyne detection for the distance measurement, and the local laser, the optical means and the optical adder mentioned above serve solely to effect a velocity measurement by determining the Doppler shift.

The invention will be more readily understood from the following description with reference to the accompanying drawings, in which:

FIG. 1 is a block diagram of a conventional telemeter;

FIG. 2 is a block diagram of the telemeter according to the invention;

Figure 3:
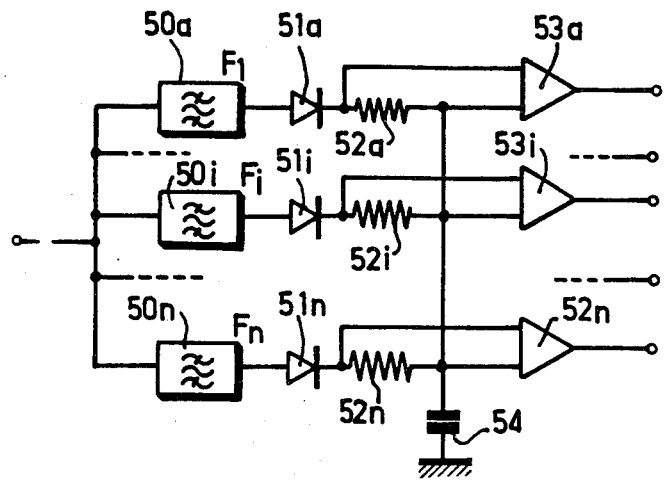
FIG. 3 shows an embodiment of the spectrum analyser forming part of the telemeter of FIG. 2.
Figure 4:
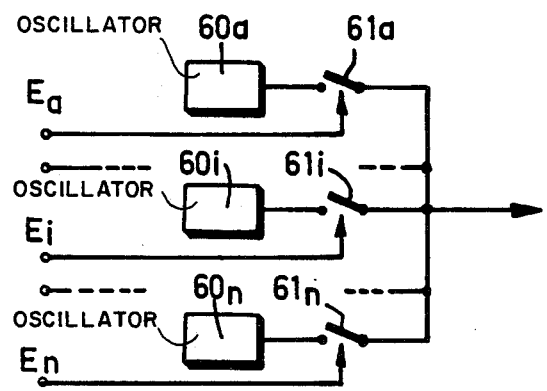
FIG. 4 shows an embodiment of the synthesizer forming part of the telemeter of FIG. 2.

Referring now to the drawings, the conventional telemeter shown in FIG. 1 is directed to a target C remote rom the apparatus by a distance D to be measured. The target is for example a vehicle such as a tank.

The telemeter comprises a pulsed laser 10 which transmits high power light signals of short duration under the control of a clock 11. The light pulses have for example a duration of about 0.1 $\mu$s and are emitted with a very low periodicity, for example every 0.1 s.

The transmission frequency $F_o$ of the laser 10 is not defined with very high accuracy, and may vary from one pulse to the other by 200 to 300 MHz. This poor precision is associated with the pulsed operation of the laser. Such a laser is for example a $CO_2$ laser of the T.E.A. or Q-switch type operating at 10.6 $\mu$m, with an average power of the order of 5 W.

The radiation transmitted by the laser 10 is concentrated on the target C by a transmission optical system 12. The radiation reflected by the target is collected by a reception optical system after a time which is a function of the distance D. By way of indication, this time is 7 $\mu$s for a distance D of 1 km and 70 $\mu$s for a distance of 10 km.

As to the optical systems 12 and 13, it should be noted that they may be in the form of a single optical system provided with a transmission-reception duplexer.

The telemeter comprises, on the other hand, a local oscillator 14 producing a continuous light wave whose frequency, known with a very high precision, is near the frequency of the pulsed laser 10. This local oscillator is constituted, in the example described, by a $CO_2$ laser.

The light signal from the reception optical system 13 and the one produced by the local oscillator 14 are combined in accordance with the principle of heterodyne detection in an optical adder 15 of which the light output signal is directed onto a photodetector 16, for example a photovoltaic detector, acting as frequency changer.

The output signal of the detector 16 is therefore an electrical signal whose amplitude is proportional to the amplitude of the reflected signal and whose frequency is the difference between the frequency $F_r$ of the reflected radiation and the frequency $F_1$ of the local oscillator 14.

The frequency $F_r$ differs from the transmission frequency $F_o$ by the Doppler shift $F_D$ due to the movement of the target:

$$F_r = F_o + F_D$$

The frequency $F_s$ of the output signal of the detector 16 is therefore:

$$F_s = F_o + F_D - F_1$$

This signal is filtered in a filter 17, then applied to a diode detector 18 which supplies a continuous signal to a chronometer 19. This chronometer connected to the clock 11 measures the time lapsed between the transmission of a pulse by the laser 10 and the detection of a reflected signal by the detector 18, this time being substantially proportional to the distance D to be measured.

The uncertainty of the frequency $F_s$ determines the bandwidth of the filter 17 and therefore the sensitivity of the detection. The Doppler shift $F_D$, in the case of a $CO_2$ laser operating at 10.6 μm and of a target having a radial velocity of 5 m/s (18 km/h), is about 1 MHz, and about 10 MHz in the case of a velocity of 50 m/s (180 km/h).

The uncertainty of $F_o$, as has been stated, is much greater since it is 200 to 300 MHz.

Under these conditions, the filter 17 must have a very wide banwidth, of about 300 MHz, and the sensitivity of the detection is very poor.

If the effect of this uncertainty of $F_o$ could be eliminated and if only the uncertainty due to the Doppler effect could be taken into account, a filter could be used having a much narrower bandwidth, for example of 10 MHz, this giving a sensitivity thirty times greater.

The telemeter according to the invention, shown in FIG. 2, enables such an improvement to be obtained. In FIG. 2, the elements which are the same as in FIG. 1 have the same references.

Apart from the elements which have already been described, the telemeter of FIG. 2 comprises a separator 30 which removes a part of the light signal transmitted by the laser and directs it on the optical adder 15. The addition of the signal supplied by the local oscillator is produced before the return of the reflected radiation. This results, at the output of the dectector 16, in a "transmission" beat signal of frequency:

$$F'_s = F_o - F_1$$

By beating this signal $F'_s$ with the "reflection" beat signal, of frequency:

$$F_s = F_o + F_D - F_1$$

a signal will be obtained whose frequency $F_b$ will be:

$$F_b = F_s - F'_s = F_D$$

The uncertainty of $F_b$ will be limited to the uncertainty due to the Doppler effect, $F_o$ being absent from the expression of $F_b$.

To effect this beat, the telemeter comprises an electronic switch 31, controlled by the clock 11 and having an output terminal E connected to a circuit comprising an ultra-rapid spectrum analyser 32, a storing device 33 and a frequency synthesizer 34 and the other output terminal R connected to a frequency changer 35 also receiving the output signal of the synthesizer 34.

During the production of a pulse by the laser 10, the switch 31 is in position E. The beat signal $F'_s$ filtered by the filter 17 is applied to the spectrum analyser 32 which determines the dominant frequency thereof and supplies the value of this frequency to the storing device 33 which stores this value until the following transmission.

As soon as the transmission is finished, and before the transmitted pulse has had time to return, the synthesizer 34 generates a signal of frequency $F'_s$ equal to the value stored in the device 33, i.e. equal to $F_o - F_1$.

Moerover, the switch 31 passes into position R under the control of the clock 11.

When the light pulse produced by the laser 10 returns into the reception optical system 13, it has a frequency $F_o + F_D$, the quantity $F_D$ representing the Doppler shift due to the radial movement of the target.

The reflected signal is combined in the optical adder 15 with the signal of the local oscillator 14 and, at the output of the detector 16, we obtain an electric signal of frequency:

$$F_o + F_D - F_1$$

This signal is applied to one of the inputs of the frequency changer 35 which receives on the other input the signal from the synthesizer 34.

Accordingly, at the output of the frequency changer 35, we obtain a beat signal of frequency:

$$(F_o + F_D - F_1) - (F_o - F_1) = F_D$$

As has been stated hereinabove, the uncertainty of the frequency of this signal is very low with regard to the uncertainty of the frequency $F_o$ of the laser 10. A filter 36 of narrow bandwidth may then be used, for example 10 MHz for the filter 17 of FIG. 1.

The filtered signal is then processed as described with reference to FIG. 1, by means of the detector 18 and the chronometer 19.

FIG. 3 shows an embodiment of the spectrum analyser 32. This analyser must have an ultra-rapid operation for the synthesizer 34 to be able to start generating the signal $F'_s$ before the return of the corresponding light pulse. This is obtained by means of a set of n adapted filters $50a, \ldots 50i \ldots 50n$ mounted in parallel, the bandwidths of which, symbolized by $Fa, \ldots Fi \ldots Fn$, are distributed regularly in the range defined by the banwidth B of the filter 17. Each filter therefore has a bandwidth equal to B/n.

An envelope detector $51i$, a resistor $52i$ and an amplifier $53i$ are associated with each filter $50i$, a capacitor 54 being connected to the output of the resistors $52i$.

When a signal is applied to the input of the filters $50i$, the filter whose frequency is nearest that of the signal supplies a higher voltage than the others.

The capacitor 54 is charged to the corresponding voltage value by means of the corresponding resistor. The amplifier $53i$ which corresponds to this resistor, thus to this filter and this frequency, supplies a voltage which differs very clearly from the voltages delivered by the other amplifiers and which may be used for writing, in the storing device 33, the value of this frequency.

The implementation of the storing device 33 does not present any difficulties. This device must be reset to zero before the beginning of each period of transmission, at the same time as the capacitor 54 is discharged.

Concerning the synthesizer 34, a set of continuously operating oscillators $60a, \ldots 60i \ldots 60n$ in parallel may be used. The selection of one of the oscillators $60i$ is effected by applying a control voltage onto the corresponding input Ei, which closes the electronic switch $61i$.

What I claim is:

1. An optical telemeter with heterodyne detection, comprising a pulsed laser controlled by a clock, an optical system at transmission for concentrating the energy supplied by the laser on a remote target, an optical system at reception for collecting part of the energy reflected by the target, a local oscillator for supplying a continuous light wave at a frequency near the transmission frequency of the pulsed laser, an optical adder for adding the reflected radiation from the reception optical system and the radiation supplied by the local oscillator, a photodetector receiving the radiation from said optical adder and supplying at its output an electric signal at the beat frequency, called reflection beat signal, and a chronometer connected to the clock and to the photodetector for measuring the time lapsed between the instant of transmission and the moment when the reflected signal is received, further comprising a separator for diverting part of the energy being transmitted by the pulsed laser onto said target and directing it towards said optical adder, means connected to said detector for storing, before the return of the reflected radiation, the transmission beat signal thus obtained, means for beating the transmission beat signal and the reflection beat signal, the resulting signal being applied to the chronometer, switch means receiving the output of the photodetector and having one output connected to said storing means and the other connected to said beating means, and having a drive input connected to said clock thereby to connect the detector to said storing means solely during the transmission of a pulse by said pulsed laser.

2. An optical telemeter according to claim 1, wherein said storing means comprises a spectrum analyser, a store and a frequency synthetizer in series.

* * * * *